(12) United States Patent
Noam et al.

(10) Patent No.: US 8,832,709 B2
(45) Date of Patent: Sep. 9, 2014

(54) NETWORK OPTIMIZATION

(75) Inventors: Oded Noam, Tel Aviv (IL); Ilan Daniel, Ramat Gan (IL); Stefan Grefen, Nierstein (DE); Ian Pattison, Edinburgh (GB)

(73) Assignee: Flash Networks Ltd., Herzliya (IL)

( * ) Notice: Subject to any disclaimer, the term of this patent is extended or adjusted under 35 U.S.C. 154(b) by 580 days.

(21) Appl. No.: 13/184,739

(22) Filed: Jul. 18, 2011

(65) Prior Publication Data

US 2012/0023504 A1 Jan. 26, 2012

Related U.S. Application Data

(60) Provisional application No. 61/365,365, filed on Jul. 19, 2010.

(51) Int. Cl.
| | |
|---|---|
| *G06F 9/46* | (2006.01) |
| *G06F 15/173* | (2006.01) |
| *H04L 29/08* | (2006.01) |
| *H04N 19/40* | (2014.01) |
| *H04N 19/149* | (2014.01) |
| *H04N 19/156* | (2014.01) |
| *H04N 19/12* | (2014.01) |
| *H04L 29/06* | (2006.01) |

(52) U.S. Cl.
CPC .......... *H04L 65/605* (2013.01); *H04L 67/2828* (2013.01); *H04N 19/00472* (2013.01); *H04N 19/00181* (2013.01); *H04N 19/00206* (2013.01); *H04N 19/00078* (2013.01); *H04L 69/04* (2013.01); *H04L 65/80* (2013.01); *H04L 65/00* (2013.01)
USPC .......................................... 718/104; 709/224

(58) Field of Classification Search
None
See application file for complete search history.

(56) References Cited

U.S. PATENT DOCUMENTS

| | | | |
|---|---|---|---|
| 5,161,044 A | 11/1992 | Nazarathy et al. | |
| 5,253,309 A | 10/1993 | Nazarathy et al. | |
| 5,278,923 A | 1/1994 | Nazarathy et al. | |
| 5,282,072 A | 1/1994 | Nazarathy et al. | |
| 5,424,680 A | 6/1995 | Nazarathy et al. | |
| 5,940,196 A | 8/1999 | Piehler et al. | |
| 5,987,019 A | 11/1999 | Raith et al. | |
| 6,038,257 A | 3/2000 | Brusewitz et al. | |
| 6,169,843 B1 | 1/2001 | Lenihan et al. | |

(Continued)

FOREIGN PATENT DOCUMENTS

EP 1439707 A3 1/2006

OTHER PUBLICATIONS

U.S. Appl. No. 12/791,013 Office Action dated Jul. 11, 2013.
U.S. Appl. No. 13/405,310 Office Action dated May 29, 2013.

(Continued)

*Primary Examiner* — Kenneth Tang
(74) *Attorney, Agent, or Firm* — K. Kligler J.P. Services Ltd.

(57) ABSTRACT

A method for handling communication data involving identifying available resources for applying compression tasks and estimating a throughput reduction value to be achieved by applying each of a plurality of different compression tasks to a plurality of media items. A cost of applying the plurality of different compression tasks to the plurality of media items is estimated. The method further includes finding an optimization solution that maximizes the throughput reduction value over possible pairs of the compression tasks and the media items, while keeping the cost of the tasks of the solution within the identified available resources and providing instructions to apply compression tasks according to the optimization solution.

23 Claims, 2 Drawing Sheets

(56) References Cited

U.S. PATENT DOCUMENTS

| | | |
|---|---|---|
| 6,285,252 B1 | 9/2001 | Huang |
| 6,304,369 B1 | 10/2001 | Piehler |
| 6,310,915 B1 | 10/2001 | Wells et al. |
| 6,381,465 B1 | 4/2002 | Chern et al. |
| 6,442,603 B1 | 8/2002 | Borella |
| 6,463,102 B1 | 10/2002 | Linzer |
| 6,466,568 B1 | 10/2002 | Raith et al. |
| 6,490,298 B1 | 12/2002 | Chin et al. |
| 6,490,727 B1 | 12/2002 | Nazarathy et al. |
| 6,563,517 B1 | 5/2003 | Bhagwat et al. |
| 6,674,796 B1 | 1/2004 | Haskell et al. |
| 6,711,300 B2 | 3/2004 | Fisher et al. |
| 6,727,915 B2 | 4/2004 | Coleman et al. |
| 6,806,863 B1 | 10/2004 | Howard |
| 6,853,379 B2 | 2/2005 | Buddemeier et al. |
| 6,876,364 B2 | 4/2005 | Buddemeier et al. |
| 6,931,159 B2 | 8/2005 | Ridge |
| 6,937,770 B1 | 8/2005 | Oguz et al. |
| 6,948,131 B1 | 9/2005 | Neven et al. |
| 6,952,212 B2 | 10/2005 | Nister et al. |
| 6,970,602 B1 | 11/2005 | Smith et al. |
| 6,981,045 B1 | 12/2005 | Brooks |
| 6,995,769 B2 | 2/2006 | Ordentlich et al. |
| 7,024,045 B2 | 4/2006 | Mcintyre |
| 7,039,251 B2 | 5/2006 | Fisher et al. |
| 7,047,305 B1 | 5/2006 | Brooks et al. |
| 7,069,573 B1 | 6/2006 | Brooks et al. |
| 7,107,039 B2 | 9/2006 | Liao et al. |
| 7,114,174 B1 | 9/2006 | Brooks et al. |
| 7,143,432 B1 | 11/2006 | Brooks et al. |
| 7,162,584 B2 | 1/2007 | Adl-Tabatabai et al. |
| 7,242,871 B2 | 7/2007 | Huang et al. |
| 7,257,641 B1 | 8/2007 | Vanbuskirk et al. |
| 7,260,826 B2 | 8/2007 | Zhang et al. |
| 7,277,588 B2 | 10/2007 | Fisher et al. |
| 7,298,360 B2 | 11/2007 | Howard |
| 7,305,139 B2 | 12/2007 | Srinivasan et al. |
| 7,324,597 B2 | 1/2008 | Mahkonen et al. |
| 7,339,993 B1 | 3/2008 | Brooks et al. |
| 7,342,884 B2 | 3/2008 | Chen et al. |
| 7,369,709 B2 | 5/2008 | Hsu et al. |
| 7,376,153 B2 | 5/2008 | Coleman et al. |
| 7,412,102 B2 | 8/2008 | Srinivasan et al. |
| 7,428,342 B2 | 9/2008 | Tu et al. |
| 7,430,329 B1 | 9/2008 | Sarna |
| 7,439,982 B2 | 10/2008 | Deniau et al. |
| 7,444,418 B2 | 10/2008 | Chou et al. |
| 7,450,571 B2 | 11/2008 | Zhang et al. |
| 7,471,726 B2 | 12/2008 | Srinivasan |
| 7,471,850 B2 | 12/2008 | Srinivasan |
| 7,474,796 B1 | 1/2009 | Fisher et al. |
| 7,483,487 B2 | 1/2009 | Liu et al. |
| 7,551,780 B2 | 6/2009 | Nudd et al. |
| 7,551,789 B2 | 6/2009 | Tu et al. |
| 7,559,078 B2 | 7/2009 | Zhang et al. |
| 7,571,246 B2 | 8/2009 | Virdi et al. |
| 8,392,748 B2 | 3/2013 | Bocharov et al. |
| 2001/0047517 A1 | 11/2001 | Christopoulos et al. |
| 2002/0009286 A1 | 1/2002 | Kasutani |
| 2002/0090140 A1 | 7/2002 | Thirsk |
| 2002/0138619 A1 | 9/2002 | Ramaley et al. |
| 2002/0156842 A1 | 10/2002 | Signes et al. |
| 2002/0169823 A1 | 11/2002 | Coulombe et al. |
| 2002/0172418 A1 | 11/2002 | Hu |
| 2002/0177454 A1 | 11/2002 | Karri et al. |
| 2003/0135867 A1 | 7/2003 | Guedalia |
| 2003/0222883 A1 | 12/2003 | Deniau et al. |
| 2004/0165783 A1 | 8/2004 | Reynolds et al. |
| 2004/0218586 A1 | 11/2004 | Khoury et al. |
| 2004/0240390 A1 | 12/2004 | Seckin |
| 2004/0244003 A1 | 12/2004 | Perfetto et al. |
| 2004/0252238 A1 | 12/2004 | Park et al. |
| 2004/0252904 A1 | 12/2004 | Fisher et al. |
| 2004/0267952 A1 | 12/2004 | He et al. |
| 2005/0002401 A1 | 1/2005 | Coleman et al. |
| 2005/0025504 A1 | 2/2005 | Huang et al. |
| 2005/0089043 A1 | 4/2005 | Seckin et al. |
| 2005/0122427 A1 | 6/2005 | Hougui et al. |
| 2005/0155080 A1 | 7/2005 | Zhang et al. |
| 2006/0026294 A1 | 2/2006 | Virdi et al. |
| 2006/0064645 A1 | 3/2006 | Neven et al. |
| 2006/0085541 A1* | 4/2006 | Cuomo et al. ............... 709/224 |
| 2006/0141923 A1 | 6/2006 | Goss |
| 2006/0156200 A1 | 7/2006 | Zhang et al. |
| 2006/0156201 A1 | 7/2006 | Zhang et al. |
| 2006/0245659 A1 | 11/2006 | Fisher et al. |
| 2006/0271683 A1 | 11/2006 | Ramaley et al. |
| 2007/0053437 A1 | 3/2007 | Muller et al. |
| 2007/0056000 A1 | 3/2007 | Pantalone et al. |
| 2007/0061862 A1 | 3/2007 | Berger et al. |
| 2007/0067818 A1 | 3/2007 | Hjelm |
| 2007/0085931 A1 | 4/2007 | Guionnet et al. |
| 2007/0092147 A1 | 4/2007 | Guionnet et al. |
| 2007/0277208 A1 | 11/2007 | Asbun et al. |
| 2008/0005246 A1 | 1/2008 | Vanbuskirk et al. |
| 2008/0046939 A1 | 2/2008 | Lu et al. |
| 2008/0052414 A1 | 2/2008 | Panigrahi et al. |
| 2008/0062322 A1 | 3/2008 | Dey et al. |
| 2008/0086570 A1 | 4/2008 | Dey et al. |
| 2008/0098446 A1 | 4/2008 | Seckin et al. |
| 2008/0101461 A1 | 5/2008 | Person et al. |
| 2008/0133766 A1 | 6/2008 | Luo |
| 2008/0158336 A1 | 7/2008 | Benson et al. |
| 2008/0162670 A1 | 7/2008 | Chapweske et al. |
| 2008/0165861 A1 | 7/2008 | Wen et al. |
| 2008/0196076 A1 | 8/2008 | Shatz et al. |
| 2008/0205291 A1 | 8/2008 | Li et al. |
| 2008/0235749 A1 | 9/2008 | Jain et al. |
| 2008/0301317 A1 | 12/2008 | Lee et al. |
| 2009/0016435 A1 | 1/2009 | Brandsma et al. |
| 2009/0019149 A1 | 1/2009 | Cohen et al. |
| 2009/0021585 A1 | 1/2009 | Ko et al. |
| 2009/0022159 A1 | 1/2009 | Coleman et al. |
| 2009/0037279 A1 | 2/2009 | Chockalingam et al. |
| 2009/0080525 A1 | 3/2009 | Haskell et al. |
| 2009/0083279 A1 | 3/2009 | Hasek |
| 2009/0103899 A1 | 4/2009 | Lessing |
| 2009/0106663 A1 | 4/2009 | Pirie et al. |
| 2009/0122877 A1 | 5/2009 | Haskell |
| 2009/0122878 A1 | 5/2009 | Liu et al. |
| 2009/0168649 A1 | 7/2009 | Assouline et al. |
| 2009/0172762 A1 | 7/2009 | Assouline et al. |
| 2009/0172763 A1 | 7/2009 | Liu |
| 2009/0178089 A1 | 7/2009 | Picco et al. |
| 2009/0185618 A1 | 7/2009 | Liu et al. |
| 2009/0185619 A1 | 7/2009 | Taleb et al. |
| 2009/0228625 A1* | 9/2009 | Kulkarni ..................... 710/263 |
| 2009/0265417 A1 | 10/2009 | Svendsen |
| 2009/0300203 A1 | 12/2009 | Virdi et al. |
| 2009/0307368 A1 | 12/2009 | Sriram et al. |
| 2010/0131671 A1 | 5/2010 | Kohli et al. |
| 2010/0217888 A1 | 8/2010 | Ukita et al. |
| 2010/0223407 A1 | 9/2010 | Dong et al. |
| 2010/0235528 A1 | 9/2010 | Bocharov et al. |
| 2010/0312828 A1 | 12/2010 | Besserglick et al. |
| 2010/0312905 A1 | 12/2010 | Sandmann et al. |
| 2011/0016209 A1* | 1/2011 | Moncaster et al. .......... 709/224 |
| 2011/0225315 A1 | 9/2011 | Wexler et al. |
| 2012/0220261 A1 | 8/2012 | Grefen et al. |
| 2012/0263241 A1 | 10/2012 | Swenson et al. |

OTHER PUBLICATIONS

Pantos, R., "HTTP Live Streaming", IETF Internet Draft, Apr. 2, 2010.

Apple Inc., "HTTP Live Streaming Overview", USA, Mar. 25, 2010.

Schwarz et al., "Overview of the Scalable Video Coding Extension of the H.264/AVC Standard", IEEE Transactions on Circuits and Systems for Video Technology, vol. 17, No. 9, pp. 1103-1120, Sep. 2007.

Ozbek et al., "A Survey on the H.264/AVC Standard", Turkish Journal of Electric Engineering & Computer Sciences, vol. 13, No. 3, pp. 287-302, year 2005.

Braden, R., "Requirements for Internet Hosts—Communication Layers", Network Working Group, RFC 1122, Oct. 1989.

(56) References Cited

OTHER PUBLICATIONS

Allman et al., "TCP Congestion Control", Network Working Group, RFC5681, Sep. 2009.

Lum et al., "A Context-Aware Decision Engine for Content Adaptation", IEEE Pervasive Computing Journal, vol. 1, issue 3, pp. 41-49, Jul.-Sep. 2002.

Vetro et al., "Video Transcoding Architectures and Techniques: An Overview", IEEE Signal Processing Magazine, vol. 20, No. 2, pp. 18-29, Mar. 2003.

U.S. Appl. No. 61/447,116, filed on Feb 28, 2011.

Keys, R.G., "Cubic Convolution Interpolation for Digital Image Processing", IEEE Transactions on Acoustics, Speech and Signal Processing, vol. ASSP-29, No. 6, pp. 1153-1160, Dec. 1981.

Ke et al., "Efficient Near-Duplicate Detection and Sub-Image Retrieval", Proceedings of the 12th Annual ACM International Conference on Multimedia, New York, USA, Oct. 10-16, 2004.

Chang et al., "RIME: A Replicated Image Detector for the World-Wide Web", Proceedings of SPIE Symposium of Voice, Video and Data Communications, Boston, USA, pp. 58-67, Nov. 1998.

Tan et al., "A Framework for Measuring Video Similarity and its Application to Video Query by Example", IEEE International Conference on Image Proccessing, vol. 2, pp. 106-110, Kobe, Japan, Oct. 24-29, 1999.

Ganchev et al., "Comparative Evaluation of Various MFCC Implementations on the Speaker Verification Task", 10th International Conference on Speech and Computer, vol. 1, pp. 191-194, University of Patras, Greece, Oct. 17-19, 2005.

Haitsma et al., "A Highly Robust Audio Fingerprinting System", IRCAM—Centre Pompidou, Paris, France, Oct. 13-17, 2002.

CCITT., "Terminal Equipment and Protocols for Telematic Services; Compression and Coding of Continuous-Tone Still Images—Requirements and Guidelines", Recommendation T.81, Sep. 1992.

Intel Inc., "Integrated Performance Primitives 5.3", Jun. 29, 2008.

Compuserve Inc., "Graphics Interchange Format Programming Reference", version 89a, Jul. 31, 1990.

World Wide Web Consortium (W3C), "Portable Network Graphics (PNG) Specification (2nd edition); Information Technology—Computer Graphics and Image Processing—Portable Network Graphics (PNG): Functional Specification", Nov. 10, 2003.

U.S. Appl. No. 12/791,013 Office action dated Jan. 9, 2013.

U.S. Appl. No. 13/041,398 Office action dated Nov. 13, 2012.

* cited by examiner

NETWORK OPTIMIZATION

CROSS-REFERENCE TO RELATED APPLICATION

This application claims the benefit of U.S. Provisional Patent Application 61/365,365, filed Jul. 19, 2010, which is incorporated herein by reference in its entirety.

FIELD OF THE INVENTION

The present invention relates generally to data communications, and specifically to methods and systems for transmitting digital media over a network.

BACKGROUND OF THE INVENTION

Communication networks are used for transmission of various types of data, including web pages, images, audio files and video streams. While the capacity of communication networks has increased dramatically in past years, making the delivery of files much faster and increasing the number of clients that can be serviced, the volumes of data transmitted over the networks has also increased. Compression methods are used to reduce the number of bits that need to be transmitted in order to convey a given amount of information. There are very sophisticated compression methods which achieve good results, but they are usually very demanding in processing power.

In the following description and claims, the term compression is used broadly to designate transmission adjustment tasks that are directed at reducing bandwidth utilization, including lossy and lossless compression, as well as data pacing and removing duplicate and/or null data.

U.S. Pat. No. 7,024,045 to McIntyre, the disclosure of which is incorporated herein by reference in its entirety, describes a dynamic compression scheme which selects the compression method used for a specific connection responsive to a current connection-latency. The scheme is designed to use CPU time conservatively.

US patent application publication 2006/0085541 to Cuomo, the disclosure of which is incorporated herein by reference in its entirety, describes determination of whether compression has a desirable effect on response time. The determination may be based on various criteria, including CPU utilization, bandwidth utilization and network time costs.

US patent application publication 2009/0083279 to Hasek, the disclosure of which is incorporated herein by reference, describes apparatus for selectively caching video content which evaluates the demand for certain content elements and formats, and accordingly manages the cache to balance between memory resources and processing resources.

U.S. Pat. No. 7,844,705 to Jones et al., the disclosure of which is incorporated herein by reference, describes monitoring a plurality of parameters of a network connecting a server and a client including client and server resource parameters and determining a desired compression level for transmitted image data according to these parameters.

SUMMARY

Embodiments of the present invention that are described hereinbelow provide methods for media streaming with enhanced server-side control.

There is therefore provided, in accordance with an embodiment of the present invention, a method for handling communication data, comprising identifying, by a processor, available resources for applying compression tasks; estimating, by the processor, a throughput reduction value to be achieved by applying each of a plurality of different compression tasks to a plurality of media items; estimating, by the processor, a cost of applying the plurality of different compression tasks to the plurality of media items; finding an optimization solution that maximizes the throughput reduction value over possible pairs of the compression tasks and the media items, while keeping the cost of the tasks of the solution within the identified available resources; and providing instructions to apply compression tasks according to the optimization solution.

Optionally, finding the optimization solution comprises selecting media items to be compressed and respective compression tasks to be used in compression of the selected media items. The method optionally includes compressing the selected media items by the respective selected tasks, responsive to the instructions.

Optionally, finding the optimization solution comprises finding, for each of a plurality of classes of media items, a corresponding task blend to be applied to tasks of the class. The method optionally includes estimating a blend of media items to be handled in a next time window and wherein finding the optimization solution is performed on the estimated blend of media items.

Optionally, finding the optimization solution is performed on a set of media items including at least one media item for which a compression task was previously selected and will not be changed. Optionally, estimating the gain comprises estimating a current gain from applying the compression task and estimating a future gain based on an estimation of a number of times a cached version of the compressed media item may be reused in the future. Optionally, estimating the gain comprises estimating based on the current gain and the future gain, while providing a higher weight per byte to the current gain relative to the future gain.

Optionally, estimating the gain comprises associating different weights to a nominal throughput reduction according to the congestion state of a transmission path of the media item for which the gain is estimated. Optionally, estimating the gain comprises assigning at least three different weights to different congestion states. Optionally, estimating the gain comprises estimating the gain in monetary units.

The method optionally includes managing, by the processor, look up tables which associate gain values of tasks with media classes and wherein estimating the gain comprises estimating the gain using the look up tables. The method optionally includes updating the look up tables based on actual compression results of media tasks.

Optionally, providing the instructions comprises instructing for at least one media item not to perform at least one compression task and wherein updating the look up tables comprises updating by comparing the results of media tasks to which a compression task was applied with results of media tasks to which the compression task was not applied. Optionally, estimating the cost comprises estimating the cost in units comparable to the units of the estimated gain.

Optionally, finding an optimization solution comprises excluding from consideration pairs of tasks and media items for which the cost is larger than the gain.

The method optionally includes repeating the estimating of gain and cost and the finding of an optimization solution, a plurality of times during the transmission of a single media item.

Optionally, the optimization solution prescribes applying compression tasks to a number of media items, and wherein providing the instructions comprises providing instructions to perform compression tasks in accordance with the optimization solution, for fewer media items than prescribed by the optimization solution.

There is further provided in accordance with an embodiment of the present invention a method for handling communication data, comprising determining, by a processor, available resources for applying compression tasks; estimating, by the processor, for a plurality of pairs of compression task and media item, a gain from applying the compression task to the media item for a current transmission of the media item and for expected future transmissions of the media item; estimating, by the processor, for the pairs of compression task and media item, a cost of applying the compression task; determining an optimization solution that maximizes the gain over the possible pairs of compression tasks and media items, while keeping a cost of the tasks of the solution within the determined available resources; and providing instructions to apply at least one compression task to at least one media item responsive to the determined optimization solution.

Optionally, estimating the gain comprises estimating a duration for which the results of applying the compression task to the media item will be held in a cache memory. Optionally, estimating the gain comprises estimating an average number of times the media item will be requested while the results of applying the compression task to the media item are stored in the cache. Optionally, estimating the gain comprises associating a greater value to current gains than to future gains.

Optionally, providing instructions to apply at least one compression task to at least one media item comprises providing instructions to apply a first compression task to a specific media item, although a result of applying a second compression task to the specific media item is available in a cache for use by the processor.

There is further provided in accordance with an embodiment of the present invention a communication apparatus, comprising an input interface configured to receive media items; a processor configured to determine available resources for applying compression tasks, to estimate a gain in reduced transmissions from applying each of a plurality of different compression tasks on a plurality of media items, to estimate a cost of applying the plurality of different compression tasks on the plurality of media items and to determine an optimization solution which maximizes a gain over the possible pairs of compression tasks and media items, while keeping a cost of the tasks of the solution within available resources; and a compression unit configured to apply compression tasks to media items responsive to determined optimization solutions of the processor.

Optionally, the compression unit is configured to operate in a plurality of modes which utilize different numbers of processor units according to a load on the compression unit, and wherein the processor is configured to determine an amount of resources to be used in order to match one of the modes of the compression unit.

Optionally, the processor is configured to determine an amount of resources to be used responsive to a value of throughput gain that can be achieved by using a higher level of resources.

There is further provided in accordance with an embodiment of the present invention a computer software product, comprising a tangible computer-readable medium in which program instructions are stored, which instructions, when read by a computer, cause the computer to:

determine available resources for applying compression tasks;

estimate a gain in reduced transmissions from applying each of a plurality of different compression tasks on a plurality of media items;

estimate a cost of applying the plurality of different compression tasks on the plurality of media items;

determine an optimization solution which maximizes the gain over the possible pairs of compression tasks and media items, while keeping a cost of the tasks of the solution within the determined available resources; and provide instructions to apply at least one compression task to at least one media item responsive to the determined optimization solution.

The present invention will be more fully understood from the following detailed description of the embodiments thereof, taken together with the drawings in which:

DETAILED DESCRIPTION OF EMBODIMENTS

In media streaming operations over communication networks, the media server and/or an intermediary compression proxy can reduce the amount of bandwidth used, by compressing the stream before transmission and/or using other transmission adjustment tasks for reducing bandwidth utilization. The compression, however, requires processing resources and the server optionally evaluates whether the compression is worthwhile.

An aspect of some embodiments of the invention relates to a transmission optimization control unit adapted to control the use of compression resources, such as processing resources and caching storage space, on a plurality of media items (e.g., transmission channels). The optimization control unit selects the media items to be compressed and the compression tasks to be applied to the selected items in a single multi-dimensional selection step. By performing a multi-dimensional selection, the available compression resources are better utilized in a manner which maximizes the compression benefits.

The transmission optimization control unit optionally, performs an optimization which selects the media items to be compressed and the compression tasks to be applied to the selected items based on a consideration of substantially all the media items handled by the compression unit. In some embodiments, the optimization is applied to an estimate of the media items which will be handled by the compression unit in the near future, rather than to the currently handled media items. The optimization may include, in some embodiments, media items, whose handling the compression unit is not configured to change. Optionally, in these embodiments, the implementation of the optimization results is achieved by setting the compression tasks applied to newly received media items in a manner directed at achieving the optimal selection of compression tasks.

In some embodiments of the invention, at least some of the available compression tasks for a specific media item may be ordered on a linear scale forming a tradeoff between compression optimization and resource utilization. The selection between tasks in such cases is optionally based on finding a best tradeoff between resource utilization and compression optimization. Alternatively or additionally, a plurality of the available compression tasks considered for a specific transmission channel cannot be ordered on a linear scale, and each is considered separately based on the specific attributes of the transmission channel.

In some embodiments of the invention, the optimization control unit measures the value of compression tasks in terms of the monetary value of their resultant savings. Optionally, the cost of performing the task is also estimated in monetary terms, allowing comparison of the cost to the gain.

An aspect of some embodiments of the invention relates to a transmission optimization control unit adapted to select media items to be optimized and/or compression tasks, to be applied to media items, using an estimate of the possibility that the results of the compression will be used on future transmission channels, for example when the results of the compression are cached for further use. Taking future use into consideration may achieve better compression results, directing processing resources to compressing transmission channels which will achieve a greater gain in the future, rather than to channels which achieve a larger current gain. Optionally, a lower value is assigned to future gains relative to current gains of same extent, taking into account the fact that the gain is in the future while the cost is current.

In some embodiments of the invention, the selection of compression tasks for specific media items is repeated periodically. Optionally, media items having an increased estimated future popularity may be recompressed using additional resources responsive to the increase in the estimated future popularity.

Optionally, the optimization control unit is configured to consider applying a stronger compression task to transmission channels whose optimized results are currently cached, when the gain from applying the stronger compression task is estimated to be greater than the cost of the additional compression.

An aspect of some embodiments of the invention relates to a transmission optimization control unit adapted to select media items to be compressed and/or compression tasks to be applied to media items, based on the value of the compression in the specific network conditions.

Optionally, the optimization control unit considers at least three or even at least five different network states and assigns a different value to data throughput reduction for each of the different network states.

An aspect of some embodiments of the invention relates to evaluating a gain from applying a compression task to data to be transmitted over a network connection.

An expected reduction in the amount of data that needs to be transmitted, due to the compression, is determined. A gain score is calculated as a non-linear function of the expected reduction, giving different weight to the expected reduction according to one or more other parameters, such as the load on the network connection or generally on a network including the connection. Optionally, the load is categorized as being in one of several states and the weight given to the expected reduction in evaluating the gain is selected according to the load state.

System Overview

Figure 1:
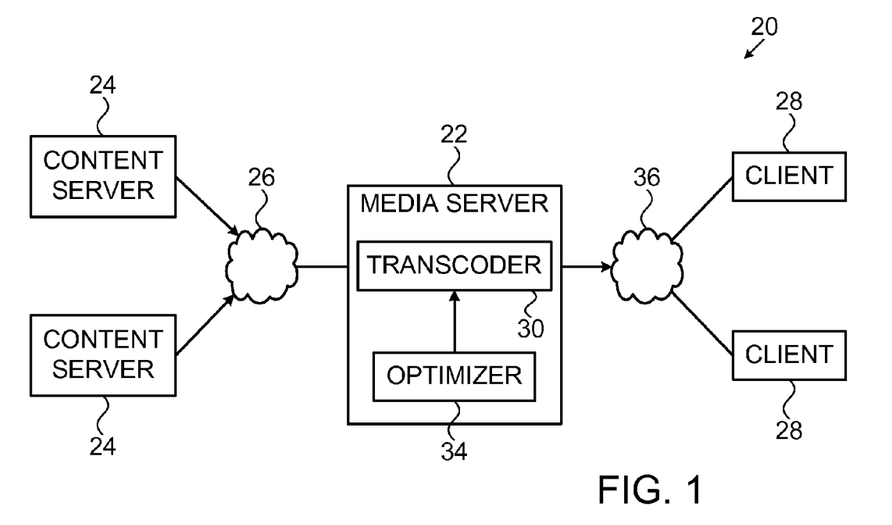
FIG. 1 is a block diagram that schematically illustrates a communication system, in accordance with an embodiment of the present invention.

FIG. 1 is a block diagram that schematically illustrates a communication system 20, in accordance with an embodiment of the present invention. A media server 22 receives various items of media content (such as video programs) from one or more content servers 24, typically via a network 26, such as the Internet or an intranet. Server 22 distributes each media content item to one or more clients 28, generally providing a plurality of media items concurrently, in response to client requests (possibly as a multicast, or video-on-demand service). Clients 28 may be mobile devices, which communicate with server 22 over wireless links, via a cellular network 36, for example. Such clients may comprise, for example, cell phones, personal digital assistants, or portable media players, for example. Alternatively or additionally, clients 28 may comprise personal computers or television set-top boxes (not shown), which communicate with server 22 over either wireless or wired links, for example over the Internet.

Server 22 typically comprises a general-purpose computer or a cluster of such computers, with suitable interfaces, one or more processors, and software for carrying out the functions that are described herein. The software may be downloaded to the computer in electronic form, over a network, for example. Alternatively or additionally, the software may be held on tangible, non-transitory storage media, such as optical, magnetic, or electronic memory media. Further alternatively or additionally, at least some of the functions of server 22 may be performed by dedicated or programmable hardware logic circuits. For the sake of simplicity and clarity, only those elements of server 22 that are essential to an understanding of the present invention are shown in the figures.

Server 22 comprises a content adaptation module, referred to herein as a transcoder 30, which receives multiple channels of media content from content servers 24. The channel content may be live or pre-recorded. Although only a single transcoder is shown in the figures, server 22 may comprise multiple transcoders, such as a respective transcoder for each content channel that the server receives. Alternatively or additionally to using a transcoder, the content adaptation module may include one or more transraters, resolution adjusters, resizers and/or compression units.

In some embodiments of the invention, transcoder 30 is adapted to apply various compression tasks to the content channels it receives, in order to increase the data throughput of network 36. The term compression tasks is intended in the present application and claims to refer broadly to channel optimization methods for reducing the amount of data transmitted, including lossless and lossy compression, null information removal, and manipulation of network and/or behavioral properties of the media stream. Further compression tasks which may be used include resolution reduction and frame rate reduction as well as other methods known in the art. The manipulation of network properties may include, for example, "pacing" or "Just in time delivery", which includes slowing down transmissions so that less bandwidth is "wasted" on end-users who abort the media stream before it is finished playing.

Server 22 further includes a load optimizer 34 which is adapted to adjust the compression tasks performed by transcoder 30, in order to maximize the benefit from server 22.

Server 22 optionally operates in a manner transparent to clients 28, which do not participate in the selection of the compression tasks and do not need to modify their operation for different compression tasks. In some embodiments, content servers 24 do not participate in selection of the compression tasks and/or are not aware of the compression.

Optimization

Figure 2:
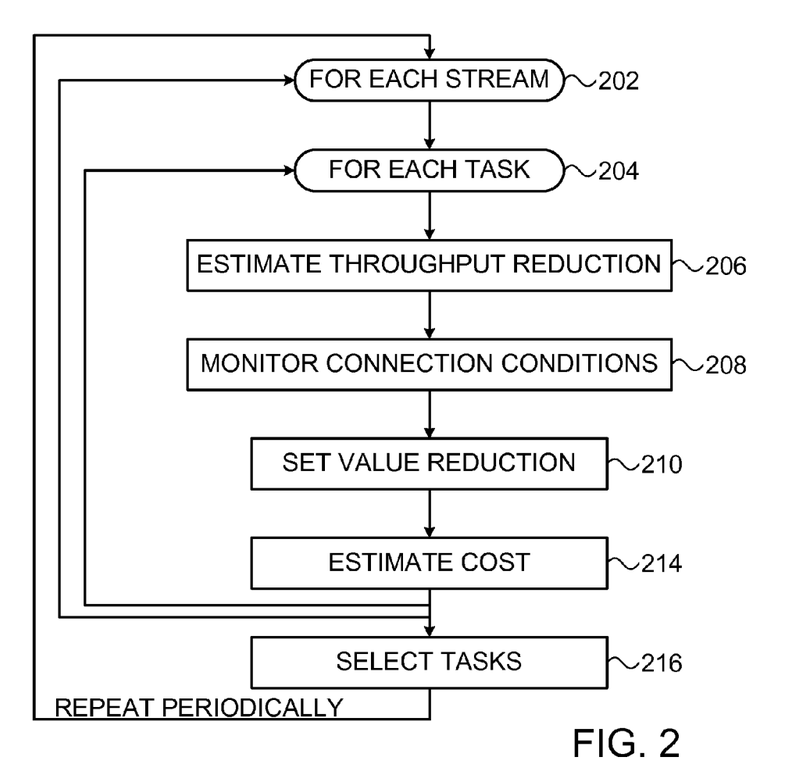
FIG. 2 is a flowchart of acts performed by a load optimizer, in accordance with an embodiment of the invention.

FIG. 2 is a flowchart of acts performed by load optimizer 34, in accordance with an embodiment of the invention. For each stream (denoted herein by s) currently handled by server 22 (202) and for each compression task (denoted herein by t) supported by server 22 (204), load optimizer 34 estimates (206) a throughput reduction y(t,s) which may be achieved by applying the compression task (t) to the stream (s).

Optimizer 34 monitors (208) the current connection conditions of the network path on which the stream is transmitted and accordingly sets (210) a monetary value v(s) to reduction of a unit (e.g., 10 Kbytes) of data for the stream in the current conditions. Load optimizer 34 optionally also estimates (214) the cost c(t) of applying the compression task to the stream.

Based on the estimated values, optimizer 34 selects (216) the compression tasks to be used by server 22. Optionally, the selection includes maximizing the value of the compression tasks applied:

$$\text{Max}\left\{\sum_{s \in S} \sum_{t \in T_s} y(t, s) \cdot v(s)\right\} \quad (1)$$

while keeping the total cost within the limits of the available resources of server 22.

$$\sum_{s \in S} \sum_{s_s t \in T_s} c_s(t) \leq K \quad (2)$$

in which $C_s(t)$ is the cost function of a task (t) on a stream (s) and K is the total available resource-cost on server 22 for compression tasks.

Throughput Reduction Estimation

As to estimating (206) the throughput reduction, server 22 optionally manages a table of compression tasks and corresponding predetermined expected throughput reductions. In some embodiments of the invention, the predetermined expected throughput reductions may depend on one or more attributes of the streams, such as their format (e.g., MP4, flash video (FLV), Matroska Video (MKV), MPEG2), their codec (e.g., H264, MP4, MPEG2, H263, VP8), their codec profile (e.g., baseline, main, high) and/or their image complexity. Streams sharing the same values of the one or more attributes used by server 22 are referred to herein as belonging to a same class.

Optionally, the metadata associated with each stream includes values of the attributes of the stream and/or a direct indication of the class of the stream. Alternatively, server 22 generates estimated attribute values based on an examination of the stream. Optionally, when attribute values are not available for the stream and/or generating estimated values would require unavailable resources, predetermined default values are used.

In some embodiments of the invention, the estimated throughput reduction tables also depend on other parameters, such as network load, time and/or date. It is noted that for some compression tasks the throughput reduction is predetermined by the goal of the compression task, while for others it is estimated using methods known in the art, based on the stream attributes and/or other parameters.

In some embodiments of the invention, information on the streams handled by server 22 is used to update the throughput reduction tables managed by the server. The update may be performed automatically using machine learning methods known in the art, or may be performed with the aid of human operator analysis. Optionally, for some or all of the handled streams, server 22 monitors the actual throughput reduction achieved by the compression task used and accordingly the estimate tables are updated. Optionally, when the actual throughput reduction for a single task and stream class varies greatly, a new class is defined based on one or more stream attribute values determined to be correlated with the different reduction values.

Optionally, when necessary to evaluate the actual throughput reduction, for example for pacing tasks, server 22 compares the sizes of streams that underwent compression with the sizes of similar streams of the same class that did not undergo compression, to determine the throughput reduction achieved by the compression. Optionally, when necessary, server 22 purposely does not apply compression tasks to one or more streams, although resources for the compression are available, so that the non-compressed streams can be used for comparison to the compressed streams.

In some embodiments, estimating (206) the throughput reduction is performed once for each stream, when the stream is first received. Optionally, the estimation is performed in advance, when possible, and the estimation results are fetched and/or received with the stream when it is requested by a client. The estimation is optionally performed in real time only for streams for which estimation is not possible in advance. Alternatively, throughput reduction may be estimated periodically, for example in those embodiments in which the compression task applied to a stream may be varied during the handling of the stream.

Referring in detail to monitoring (208) the current network throughput level, in some embodiments of the invention the monitoring is performed in real time. The monitoring optionally includes determining the round trip time (RTT) of the connection and/or a measured throughput of the connection. Optionally, information from the transport layer protocol used for delivering the data is used in the monitoring. For example, when the TCP protocol is used, the network throughput level may be estimated from the parameters of the TCP layer. Alternatively or additionally, real time network information is received from data feeds of network switches, routers and/or other network elements.

Referring in detail to setting (210) a monetary value v(s) to data reduction, in some embodiments of the invention, the value is a function of the current conditions of the specific network path carrying the stream. For example, the monetary value v(s) may be set according to the congestion level of the network path, the round trip delay and/or the rate of packet loss.

In some embodiments, the setting of the monetary value v(s) does not depend on the conditions of the general network, beyond the affect of the conditions of the general network on the specific network path. Alternatively, the monetary value v(s) is set as a combined function of the conditions of the specific network path and those of the entire network, thus giving weight also to the benefit of the entire network from performing the compression task.

In one embodiment, the monetary value is defined as a step function of one or more performance parameters of the connection, such as throughput and/or round trip delay, giving a higher value to data reduction in higher load conditions. For example, the step function may identify three levels: a vacant level which is assigned a low value (e.g., 0.5), a saturated level which is assigned a medium value (e.g., 1) and a congested region which is assigned a high value (e.g., 1.2). It is noted that the step function may define a larger number of levels, possibly at least five or even at least ten, or may include as few as two levels. It is noted that in some cases the same value may be assigned to all load levels, in which case the value v(s) is constant, e.g., v(s)=1.

Alternatively to a step function, other functions, such as a linear function or an exponential function may be used. In some embodiments of the invention, the value function used is determined based on the extra cost consumers are willing to pay for additional bandwidth and/or for a higher QoS level. For example, if clients are charged according to the bandwidth they actually use, the value of reducing an amount of bandwidth could be evaluated according to the extra profit achieved by selling the saved bandwidth to a different client. If clients are charged a subscription rate for up to a given amount of data, the value could be estimated according to the number of additional subscriptions which could be received due to the compression tasks performed.

In some embodiments of the invention, an aggregation of measured data throughput compared to network capacity model is used.

Referring in detail to estimating (214) the cost $c_s(t)$ of applying the compression task to the stream, in some embodiments of the invention, the cost is a function of the processing resources required to perform the compression task. In a specific embodiment, the cost is calculated by determining the sum of the overall costs of the server including, for example, power, carbon offsetting and maintenance costs and dividing the sum by the total available resources to receive the cost per unit resource unit. When server 22 has a plurality of different types of resources used in estimating the cost, a separate cost is optionally defined for each type of resource. Optionally, the costs of all the resources are defined in the same monetary units, so that they can easily be summed when required.

Optionally, optimizer 34 manages a look up table which states for each compression task a predetermined cost function used to estimate the cost of applying the task on the stream. The cost function may depend on one or more attribute values of the streams, as discussed above regarding the estimation (206) of the throughput reduction. It is noted that the attributes used in estimating the cost may be the same as used in estimating the throughput reduction, or may be different.

In some embodiments of the invention, optimizer 34 collects statistics on the resource usage of each stream and these statistics are used to estimate the resources required in the near future by the stream and/or by streams of similar types. Optionally, the resources required for a specific compression task on a specific stream are estimated based on the average resources required by the compression task on the stream during a sliding window period as close as possible to the time the estimate is performed. Alternatively or additionally, a time-based exponential decay may be used to weigh the resource usage information of the stream.

The monetary value $v(s)$ is optionally calculated based on the value of the extra bandwidth available due to the throughput reduction. In some embodiments of the invention, the monetary value $v(s)$ is based on the savings from avoiding the need to upgrade the network. Alternatively or additionally, the monetary value $v(s)$ is indicative of the value of the better service (e.g., lower latency) on the reputation of the service provider of the streams and/or of the value of the ability to sell higher quality of service (QoS) packages due to the compression task.

Repetition

The method of FIG. 2 is optionally repeated periodically, in order to make decisions on which compression tasks are to be performed in real time. In some embodiments, the compression tasks applied to a specific stream may be changed as required, such that a single video stream transmitted to a specific client may undergo a plurality of different compression methods during its transmission.

Alternatively, the compression tasks applied to a specific stream are determined when the handling of the stream begins and is not changed during the handling, at all, or is only changed to a limited extent. For example, in some embodiments, the tasks applied are not changed, but the parameters of the applied tasks, such as the compression rate may be changed.

Optionally, in accordance with this alternative, the task selection does not select specific tasks to be performed for specific streams, but rather selects a desired compression-task-blend which optimizes the use of the resources of transcoder 30. Until a new task blend is determined, the compression tasks applied to newly handled streams are selected in a manner which attempts to bring the actual tasks applied to the handled streams as close as possible to the desired task blend.

The compression task blend optionally indicates for each stream class, percentages of the streams of the class to which a specific set of one or more compression tasks are to be applied. For example, for a class A, the selection may determine that 40% of the streams of the class are to be handled by task 1, 30% by tasks 2 and 5, 20% by task 3 and 10% should not be compressed at all. For each new stream of class A, server 22 selects a set of one or more tasks to be applied to the stream, so that the task-blend applied to the streams of class A currently handled by server 22 will be as close as possible to the desired task-blend of the class.

Alternatively or additionally, the compression task blend indicates an overall task blend to be used.

Instead of repeating the cost and value determination for each stream (s) currently handled by server 22 (202), server 22 estimates the classes of the streams which will be handled in a future window and the cost and value determination are performed on the estimated future streams. In some embodiments of the invention, the estimation of the future streams is performed by collecting statistics on the classes of streams previously received and using these statistics for the future stream estimation. Optionally, a Monte Carlo method is used in the future stream estimation. In some embodiments of the invention, the method is repeated every predetermined period. The predetermined period may be relatively short, for example, less than an hour, less than 15 minutes or even less than every 5 minutes. In embodiments in which the throughput reduction and/or costs of tasks are estimated only once, when the stream is received, the selection (216) of tasks may be performed less than every minute or even less than every five seconds. Alternatively, a longer predetermined period may be used, possibly longer than 6 hours or even longer than 12 hours. In other embodiments, the method is repeated when the compression tasks used are believed to be less than optimal, for example based on monitoring the total throughput reduction due to the currently applied compression tasks. In still other embodiments, the method is repeated each time the set of streams handled by server 22 changes (e.g., a new stream is handled or a stream is terminated) or the set of streams handled by server 22 changes in at least a predetermined number of streams.

In some embodiments of the invention, rather than repeating the entire method, load optimizer 34 periodically refreshes data considered old or out of date and/or determines information required for newly received streams.

In the above description, for simplicity of optimizer 34, a simple value measure relating solely to throughput was used. In other embodiments, a more complex value measure may be used, taking into account other factors beyond throughput reduction, such as faster delivery. In addition, the cost function may depend on other factors such as increased delay, cache utilization and/or quality degradation (e.g., image degradation due to lossy compression).

In some embodiments, optimizer 34 directs streams to different processors of server 22, according to the compression task to be performed on the stream. For example, server 22 may include different processors which are configured to perform specific compression tasks and optimizer 34 directs streams to processors according to the selected compression task. Alternatively or additionally, optimizer 34 may direct streams to processors according to their capacity. Optionally, if necessary to transfer the handling of a stream between processors due to a change in the compression task applied to the stream, the cost of the transfer is taken into consideration in determining whether to change the compression task.

It will be understood that in some cases optimizer 34 may determine not to apply compression tasks to any of the considered video streams.

Task Selection

As to selecting (216) the compression tasks to be used, in some embodiments of the invention an attempt is made to continuously use as much as possible of the resource-cost K of server 22. Alternatively, for example when the processors of server 22 are used for additional tasks not related to compression and/or when server 22 uses one or more energy-saving processors, optimizer 34 also selects the extent to which the resources of server are used for the compression tasks. Optionally, optimizer 34 is configured with a plurality of resource levels that may be used by server 22 and with corresponding saving value thresholds which warrant using a higher level of resources. In operation, optimizer 34 first selects tasks requiring a first level of resources. Optimizer 34 then determines a set of tasks to be performed with an additional level of resources and their corresponding value. Only if the value of the tasks is above a predetermined threshold are these tasks performed.

In some embodiments of the invention, in selecting (216) the compression tasks to be used, optimizer 34 first verifies for some or all of the possible tasks that they are worth being implemented, and only tasks worth being implemented on their own are taken into consideration in selecting the compression tasks. The value of the saving for the specific task on the specific stream is compared to the cost for the specific stream, and only if the task in itself is worthwhile is it considered in the task selection. Optionally, the compression task value and the task cost are normalized to the same monetary units for the comparison. In some embodiments, the same cost measure is used in determining whether a specific task is worthwhile and in the general selection of tasks. Alternatively, different task measures may be used.

Figure 3:
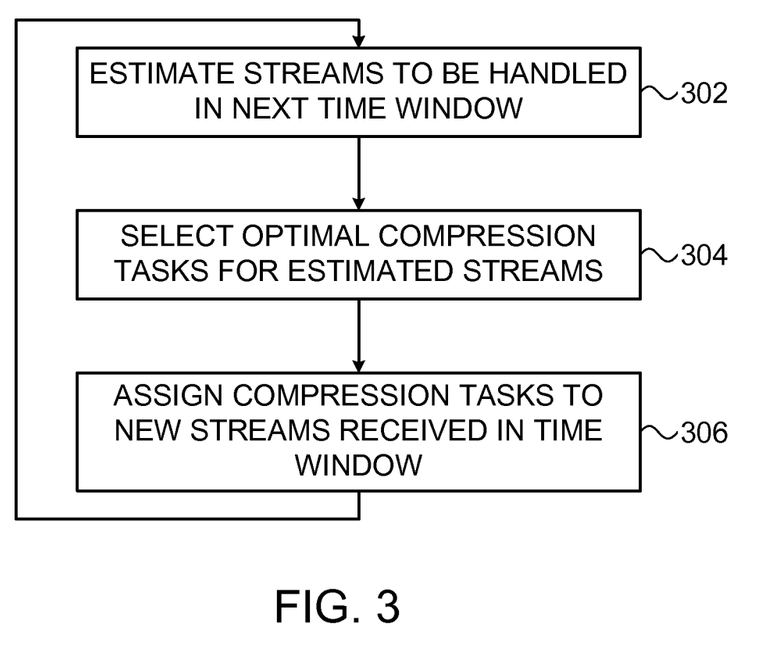
FIG. 3 is a flowchart of acts performed by a load optimizer, in accordance with another embodiment of the invention.

FIG. 3 is a flowchart of acts performed by optimizer 34, in accordance with an embodiment of the invention. For each time window, optimizer 34 estimates (302) the number and/or types of streams that will be handled by server 22 in the time window. As mentioned above, the estimate may be performed based on previous statistics using a Monte Carlo method. Alternatively or additionally, time dependent statistics on the types of streams during specific hours of the day, days of the week, days of the month and/or other time profiles may be used in the estimation.

For the estimated streams of the time window, an optimal assignment of compression tasks to the estimated streams is selected (304), for example using the method of FIG. 2, although other methods may be used. For example, simpler sub-optimal optimization methods, in order to reduce the resources spent on the optimization of task assignment. For example, mathematical optimization methods, such as simulated annealing, linear programming and/or dynamic programming as well as genetic optimization methods, may be employed.

The estimation (302) and selection (304) of optimal compression tasks are optionally performed before the time window begins. Optionally, the estimation (302) and selection (304) are performed shortly before time window, such that the decisions made in the estimation (302) and selection (304) are based on real time information. Alternatively, for simplicity, the estimation (302) and/or selection (304) may be performed for several consecutive time windows at a single time.

During the time window, optimizer 34 assigns (306) zero, one or a plurality of compression tasks to each newly received stream, in a manner directed to bringing the actual assignment of tasks to handled streams to be as close as possible to the selected (304) optimal compression tasks for the time window.

Optionally, assigning (306) the compression tasks for a specific received stream comprises determining for the class of the specific received stream, the tasks currently handled that belong to the class and the task blend selected for the class in the optimization for the current window. Optimizer 34 then selects for the received stream a set of zero or more tasks which will minimize the difference between the current task blend and the task selection of the optimization.

The length of the time window is optionally chosen according to the available processing resources for performing the optimization. In some embodiments, the time window is shorter than a minute or even shorter than seconds. In other embodiments, a time window longer than 10 minutes or even longer than an hour, is used. In some embodiments, the estimation (302), selection (304) and task assignment are repeated for each received stream.

Caching

The value of compression tasks, in some embodiments as described above, only takes into account the gain from the compression of the current stream being compressed. In other embodiments, when the results of a compression task are cached for further use, the value of the task is formed of a basic value due to the current gain and a future value factor estimating the gain from future use of the cached results of the task.

Optionally, the future gain value is calculated as an average value $v_{avr}$ assigned to the gain from a single use of the cached results of the compression task, multiplied by an estimated number of times the cached results are expected to be used. The expected use may be based, for example, on an estimate of future popularity of the media data. The average future gain value is optionally set to a value lower than the basic value assigned to the current gain, taking into account a notion of financing, that the gain is received only in the future while the payment in cost is immediate.

The estimate of the number of future uses of the cached compression task results is optionally based on the number of times the optimized stream or portion thereof was required already, during a predetermined period. Thus, a specific stream may be considered at an early stage as not warranting compression, but at a later stage is optimized due to expected future benefits. Furthermore, a specific stream may be initially assigned a first, low cost, compression task and thereafter assigned a second, different, higher cost compression task.

In some embodiments of the invention, the estimate of the number of future uses of compression results is based on the expected time period for which the results will be held in the cache used to store the compression results. The expected time period optionally depends on the current occupancy of the cache. When the cache occupancy is relatively low, the time period the results will be held in the cache is expected to be longer and hence the number of times the results will be used would generally be larger. In some embodiments of the invention, the expected time period is estimated based on one or more other attributes used by the caching mechanism in determining which cached data elements are to be dropped, such as the priority assigned to the stream and/or the extent of the gain achieved by the compression task.

In some embodiments of the invention, optimizer 34 monitors the client request patterns of streams and accordingly estimates the expected future requests. Optionally, optimizer 34 classifies the streams into classes expected to have similar client request patterns and estimates the expected number of future requests for a specific stream according to the class of the stream. Alternatively, the streams are classified into predetermined classes of content type, and the expectancy of reusing streams is estimated for each class.

In some embodiments of the invention, the caching of compression results includes storing the entire optimized data. In other embodiments, the caching of compression results includes storing hints for faster compression, such as, for example, the hints described in US patent publication 2001/0047517 to Christopoulos et al., in European patent publication 1439707 or U.S. Pat. No. 7,162,584, the disclosures of which are incorporated herein by reference.

EXAMPLES

In table 1, a general qualitative list of compression tasks and their corresponding values and costs is provided in accordance with an embodiment of the invention:

TABLE 1

| Task | Saving value | Cost |
| --- | --- | --- |
| Lossless compression | Constant average estimate | Relatively low |
| Lossy compression | Predetermined saving at selected level (e.g., between 15-40%) | High |
| Just in time video stream delivery | Variable amount of saving, in reverse correlation to the network occupancy | Low |

In a specific example embodiment, the following specific tasks are considered:

TABLE 2

| Task | Average Saving | CPU utilization |
| --- | --- | --- |
| Lossless compression | 13% | 0.1% |
| Low complexity Lossy compression | 30% | 16% |
| High complexity Lossy compression | 59% | 44% | with the following predetermined functions:

TABLE 3

| Byte value | Benefit of Lossless Compression | Benefit of Low-complexity Lossy Compression | Benefit of High-complexity Lossy Compression |
| --- | --- | --- | --- |
| 0.2 | 0.22 | 0.52 | 0.81 |
| 0.4 | 0.19 | 0.49 | 0.78 |
| 0.6 | 0.16 | 0.46 | 0.75 |

TABLE 3-continued

| Byte value | Benefit of Lossless Compression | Benefit of Low-complexity Lossy Compression | Benefit of High-complexity Lossy Compression |
| --- | --- | --- | --- |
| 0.8 | 0.14 | 0.44 | 0.73 |
| 1.0 | 0.12 | 0.42 | 0.71 |
| 1.2 | 0.11 | 0.41 | 0.70 |
| 1.4 | 0.09 | 0.39 | 0.68 |
| 1.6 | 0.08 | 0.38 | 0.67 |
| 1.8 | 0.06 | 0.36 | 0.65 |
| 2.0 | 0.05 | 0.35 | 0.64 |
| 2.2 | 0.04 | 0.34 | 0.63 |
| 2.4 | 0.03 | 0.33 | 0.62 |
| 2.6 | 0.02 | 0.32 | 0.61 |
| 2.8 | 0.01 | 0.31 | 0.60 |
| 3.0 or greater | 0.00 | 0.30 | 0.59 |

The benefit of the low-complexity lossy compression is assumed in table 3 to be the benefit of the lossy compression (0.3) added to the benefit from the lossless compression. Similarly, the benefit of the high-complexity lossy compression is assumed to be 0.59 added to the benefit from the lossless compression.

This example illustrates the routine use of both lossless and lossy compression together. In other embodiments, the combined use of lossless and lossy compression may be performed on a stream by stream basis or may not be selected at all.

In an exemplary scenario, server 22 handles the following 10 media items (e.g., video streams):

TABLE 4

| ID | byte value | repeat exp. | cache status |
| --- | --- | --- | --- |
| 10001 | 1.2 | 3.71 | HIT_LOW |
| 10002 | 0.8 | 0.55 | MISS |
| 10003 | 1.4 | 0.82 | MISS |
| 10004 | 2 | 0.15 | MISS |
| 10005 | 2.2 | 0.38 | MISS |
| 10006 | 1 | 0.44 | MISS |
| 10007 | 0.8 | 1.22 | HIT_LOW |
| 10008 | 1.6 | 0.46 | MISS |
| 10009 | 1 | 1.62 | HIT_HIGH |
| 10010 | 0.4 | 0.88 | HIT_LOW | wherein ID is an identification of the media item, "byte value" is an estimated value associated with reducing a byte from the path of the connection, "repeated expectancy" denotes an estimated number of additional times the same media item will be requested in the future, and "cache status" denotes the current status of the media item in the cache ("MISS" meaning the item is not in the cache, "HIT_LOW" meaning a low-complexity compressed version of the item is stored in the cache, and "HIT_HIGH" meaning a high-complexity compressed version of the item is stored in the cache).

Following in table 5 is a comparison of the savings achieved by two different methods in accordance with embodiments of the present invention. In a first method denoted max reduction selection, cached compressed data is always used when available and the available processing resources are utilized in a manner which maximizes the reduction in bandwidth, regardless of future savings and of the value of throughput reduction.

In accordance with a second method, optimizer 34 determines the actual savings for each method, using the formulas:

Actual saving:=current saving+future saving

Current saving:=[byte value]*[compression benefit]

Future saving:=[repeat exp.]*([byte value exp]*[lossy compression benefit]−[cache retrieval cost])

Method 1 results in selection of combination A, while method 2 results in the selection of combination B. For each combination, table 5 illustrates the savings calculated using the first method (in the columns titled apparent savings) and for the second method (in the columns titled actual savings). The values in table 5 were provided from simulations calculated using arbitrary values for the cache retrieval cost and the byte value expectancy (e.g., a factor indicative of the value of future savings compared to current savings). It is noted that the results of the simulations are brought merely to illustrate the possibilities of different methods to achieve different optimization assignment and that other assumptions, parameters and/or simulations will provide different results.

TABLE 5

| ID | Combination A | Apparent Savings Combination A | Actual Savings Combination A | Combination B | Apparent Savings Combination B | Actual Savings Combination B |
|---|---|---|---|---|---|---|
| 10001 | CACHED_LOW | 0.30 | 0.41 | HIGH | 0.59 | 1.49 |
| 10002 | LOSSLESS | 0.13 | 0.14 | LOW | 0.30 | 0.60 |
| 10003 | LOW | 0.30 | 0.62 | LOW | 0.30 | 0.62 |
| 10004 | LOW | 0.30 | 0.39 | LOSSLESS | 0.13 | 0.05 |
| 10005 | LOW | 0.30 | 0.44 | LOSSLESS | 0.13 | 0.04 |
| 10006 | LOW | 0.30 | 0.55 | LOSSLESS | 0.13 | 0.12 |
| 10007 | CACHED_LOW | 0.30 | 0.44 | CACHED_LOW | 0.30 | 0.44 |
| 10008 | LOW | 0.30 | 0.51 | LOW | 0.30 | 0.51 |
| 10009 | CACHED_HIGH | 0.59 | 0.65 | CACHED_HIGH | 0.59 | 0.65 |
| 10010 | CACHED_LOW | 0.30 | 0.49 | CACHED_LOW | 0.30 | 0.49 |

The apparent savings achieves a higher score for combination A, and the actual savings achieves a higher score for combination B. Therefore, the different methods result in different selections. The first method may be used when a simple optimization is desired, while the second method would be used in cases in which a more accurate optimization is desired.

CONCLUSION

While the above description relates primarily to handling video streams, it will be understood that the methods described above may be used on streams of other data including, for example, web pages, images and audio files, as well as on data presented in other forms, such as in files.

It will also be understood that it is not necessary that all compression tasks be considered for all media items. Rather, some compression tasks may be considered only for some of the media items, if so desired.

It will be appreciated that the above described methods and apparatus are to be interpreted as including apparatus for carrying out the methods and methods of using the apparatus. It should be understood that features and/or steps described with respect to one embodiment may sometimes be used with other embodiments and that not all embodiments of the invention have all of the features and/or steps shown in a particular figure or described with respect to one of the specific embodiments.

It is noted that some of the above described embodiments may include structure, acts or details of structures and acts that may not be essential to the invention and which are described as examples. Structure and acts described herein are replaceable by equivalents which perform the same function, even if the structure or acts are different, as known in the art. The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art. Therefore, the scope of the invention is limited only by the elements and limitations as used in the claims, wherein the terms "comprise," "include," "have" and their conjugates, shall mean, when used in the claims, "including but not necessarily limited to."

The invention claimed is:

1. A method for handling communication data, comprising:

identifying, by a processor, available resources for applying compression tasks;

estimating, by the processor, a throughput reduction value to be achieved by applying each of a plurality of different compression tasks to a plurality of media items;

estimating, by the processor, a cost of applying the plurality of different compression tasks to the plurality of media items;

finding an optimization solution that maximizes the throughput reduction value over possible pairs of the compression tasks and the media items, while keeping the cost of the tasks of the solution within the identified available resources;

providing instructions to apply compression tasks according to the optimization solution;

managing, by the processor, look up tables which associate gain values of tasks with media classes; and updating the look up tables based on actual compression results of media tasks, wherein estimating the gain comprises estimating the gain using the look up tables, wherein providing the instructions comprises instructing for at least one media item not to perform at least one compression task, and wherein updating the look up tables comprises updating by comparing the results of media tasks to which a compression task was applied with results of media tasks to which the compression task was not applied.

2. The method of claim 1, wherein finding the optimization solution comprises selecting media items to be compressed and respective compression tasks to be used in compression of the selected media items and comprising compressing the selected media items by the respective selected tasks, responsive to the instructions.

3. The method of claim 1, wherein finding the optimization solution comprises finding, for each of a plurality of classes of media items, a corresponding task blend to be applied to tasks of the class.

4. The method of claim 1, comprising estimating a blend of media items to be handled in a next time window and wherein finding the optimization solution is performed on the estimated blend of media items.

5. The method of claim 1, wherein finding the optimization solution is performed on a set of media items including at least one media item for which a compression task was previously selected and will not be changed.

6. The method of claim 1, wherein the optimization solution prescribes applying compression tasks to a number of media items, and wherein providing the instructions comprises providing instructions to perform compression tasks in accordance with the optimization solution, for fewer media items than prescribed by the optimization solution.

7. The method of claim 1, wherein estimating the gain comprises estimating a current gain from applying the compression task and estimating a future gain based on an estimation of a number of times a cached version of the compressed media item may be reused in the future.

8. The method of claim 7, wherein estimating the gain comprises estimating based on the current gain and the future gain, while providing a higher weight per byte to the current gain relative to the future gain.

9. The method of claim 1, wherein estimating the gain comprises associating different weights to a nominal throughput reduction according to the congestion state of a transmission path of the media item for which the gain is estimated.

10. The method of claim 9, wherein estimating the gain comprises assigning at least three different weights to different congestion states.

11. The method of claim 1, wherein estimating the gain comprises estimating the gain in monetary units.

12. The method of claim 1, wherein estimating the cost comprises estimating the cost in units comparable to the units of the estimated gain.

13. The method of claim 12, wherein finding an optimization solution comprises excluding from consideration pairs of tasks and media items for which the cost is larger than the gain.

14. The method of claim 1, comprising repeating the estimating of gain and cost and the finding of an optimization solution, a plurality of times during the transmission of a single media item.

15. A method for handling communication data, comprising:
  determining, by a processor, available resources for applying compression tasks;
  estimating, by the processor, for a plurality of pairs of compression task and media item, a gain from applying the compression task to the media item for a current transmission of the media item and for expected future transmissions of the media item;
  estimating, by the processor, for the pairs of compression task and media item, a cost of applying the compression task;
  determining an optimization solution that maximizes the gain over the possible pairs of compression tasks and media items, while keeping a cost of the tasks of the solution within the determined available resources;
  providing instructions to apply at least one compression task to at least one media item responsive to the determined optimization solution;
  managing, by the processor, look up tables which associate gain values of tasks with media classes; and
  updating the look up tables based on actual compression results of media tasks,
  wherein estimating the gain comprises estimating the gain using the look up tables,
  wherein providing the instructions comprises instructing for at least one media item not to perform at least one compression task, and
  wherein updating the look up tables comprises updating by comparing the results of media tasks to which a compression task was applied with results of media tasks to which the compression task was not applied.

16. The method of claim 15, wherein estimating the gain comprises estimating a duration for which the results of applying the compression task to the media item will be held in a cache memory.

17. The method of claim 16, wherein estimating the gain comprises estimating an average number of times the media item will be requested while the results of applying the compression task to the media item are stored in the cache.

18. The method of claim 15, wherein estimating the gain comprises associating a greater value to current gains than to future gains.

19. The method of claim 15, wherein providing instructions to apply at least one compression task to at least one media item comprises providing instructions to apply a first compression task to a specific media item, although a result of applying a second compression task to the specific media item is available in a cache for use by the processor.

20. A communication apparatus, comprising:
  an input interface configured to receive media items;
  a processor configured to determine available resources for applying compression tasks, to estimate a gain in reduced transmissions from applying each of a plurality of different compression tasks on a plurality of media items, to estimate a cost of applying the plurality of different compression tasks on the plurality of media items, to determine an optimization solution which maximizes a gain over the possible pairs of compression tasks and media items, while keeping a cost of the tasks of the solution within available resources, to manage look up tables which associate gain values of tasks with media classes and to update the look up tables based on actual compression results of media tasks; and
  a compression unit configured to apply compression tasks to media items responsive to determined optimization solutions of the processor,
  wherein the processor is configured to estimate the gain using the look up tables,
  wherein the processor is configured to instruct for at least one media item not to perform at least one compression task, and
  wherein the processor is configured to update the look up tables by comparing the results of media tasks to which a compression task was applied with results of media tasks to which the compression task was not applied.

21. The apparatus of claim 20, wherein the compression unit is configured to operate in a plurality of modes which utilize different numbers of processor units according to a load on the compression unit, and wherein the processor is configured to determine an amount of resources to be used in order to match one of the modes of the compression unit.

22. The apparatus of claim 21, wherein the processor is configured to determine an amount of resources to be used responsive to a value of throughput gain that can be achieved by using a higher level of resources.

23. A computer software product, comprising a tangible computer-readable medium in which program instructions are stored, which instructions, when read by a computer, cause the computer to:

determine available resources for applying compression tasks;

estimate a gain in reduced transmissions from applying each of a plurality of different compression tasks on a plurality of media items;

estimate a cost of applying the plurality of different compression tasks on the plurality of media items;

determine an optimization solution which maximizes the gain over the possible pairs of compression tasks and media items, while keeping a cost of the tasks of the solution within the determined available resources;

provide instructions to apply at least one compression task to at least one media item responsive to the determined optimization solution;

manage look up tables which associate gain values of tasks with media classes; and update the look up tables based on actual compression results of media tasks, wherein the program instructions estimate the gain using the look up tables, wherein the program instructions instruct for at least one media item not to perform at least one compression task, and wherein the program instructions update the look up tables by comparing the results of media tasks to which a compression task was applied with results of media tasks to which the compression task was not applied.

\* \* \* \* \*